Sept. 29, 1959 W. E. REASER 2,906,065
EDGE GRINDING MACHINE
Filed Dec. 6, 1956 5 Sheets-Sheet 1
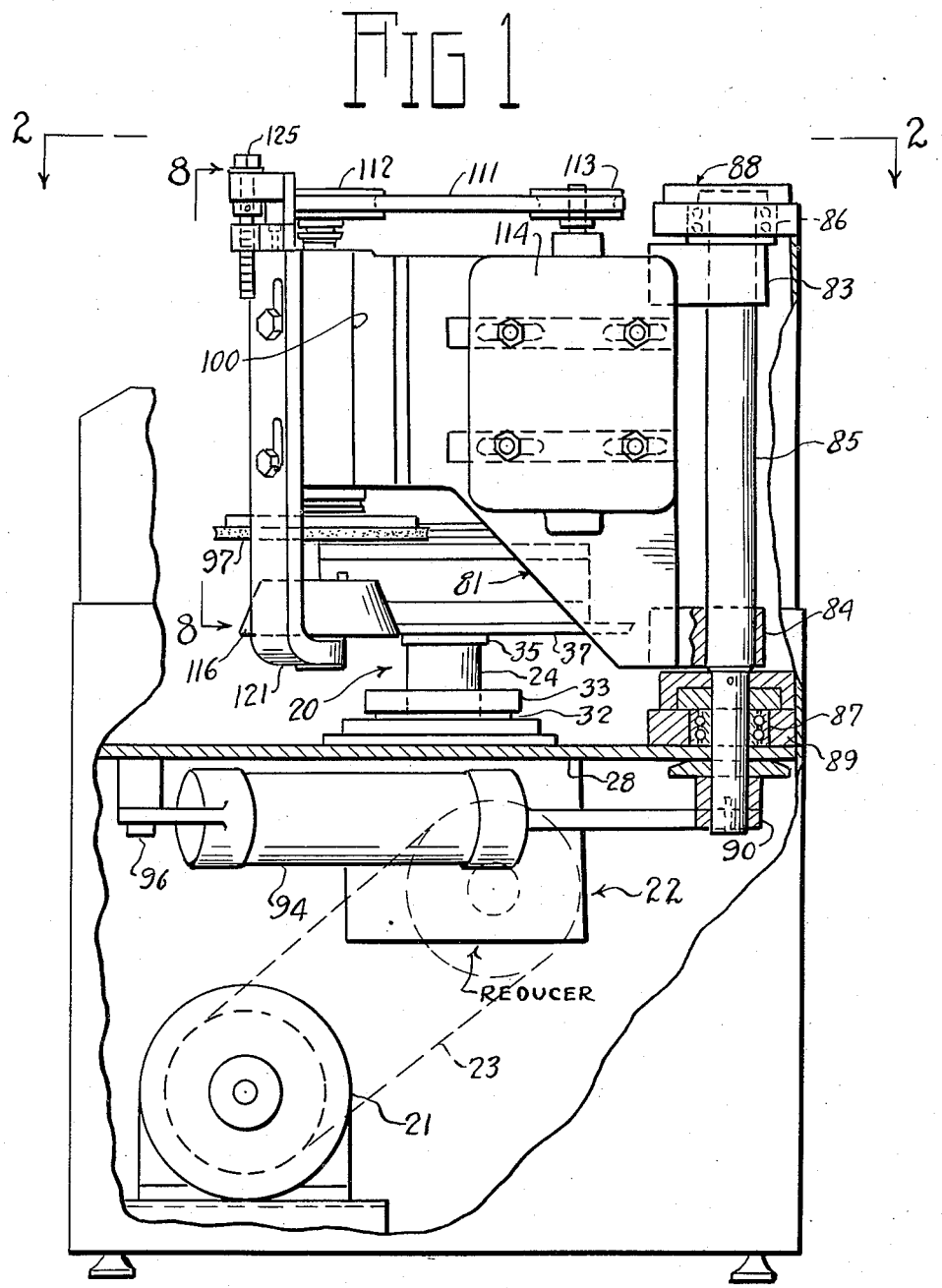
INVENTOR.
Warren E. Reaser
BY Owen + Owen
ATTORNEYS

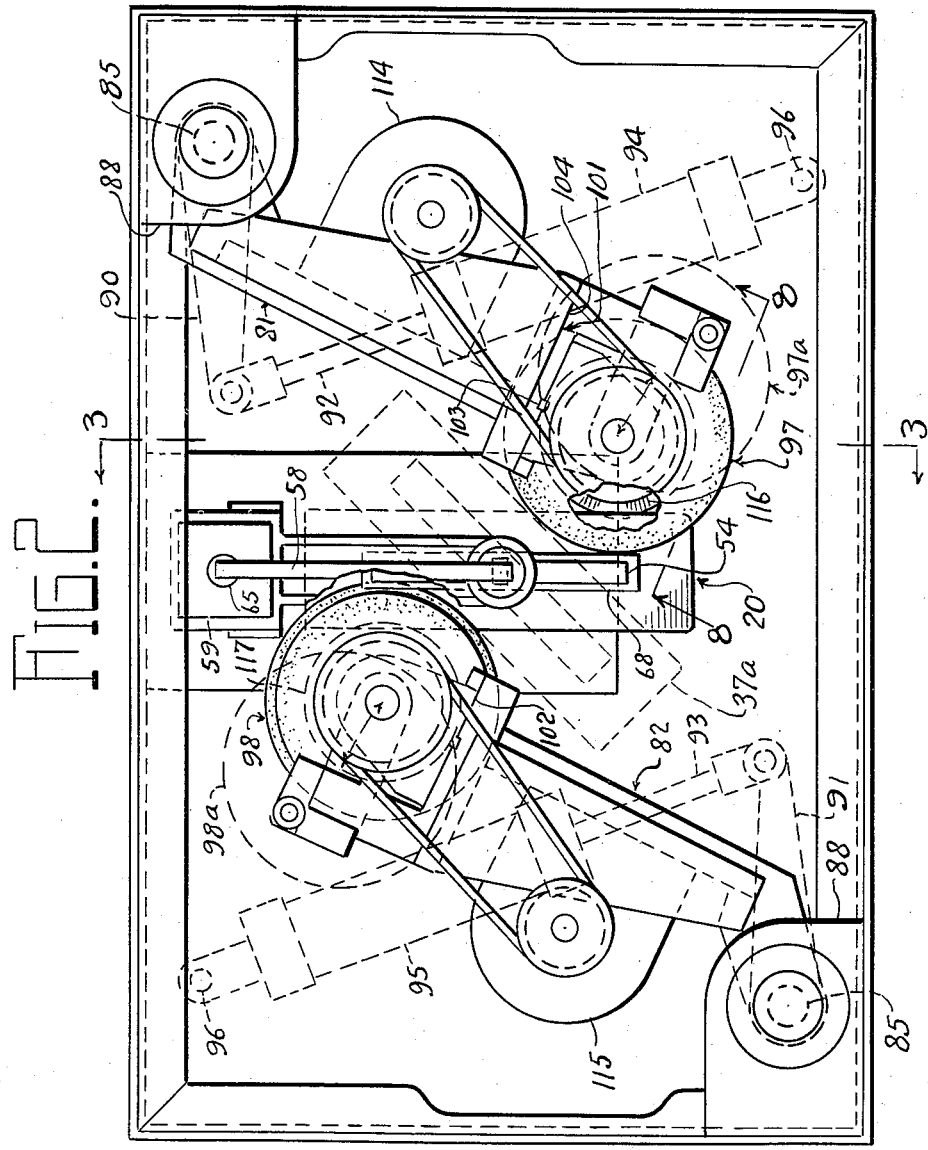

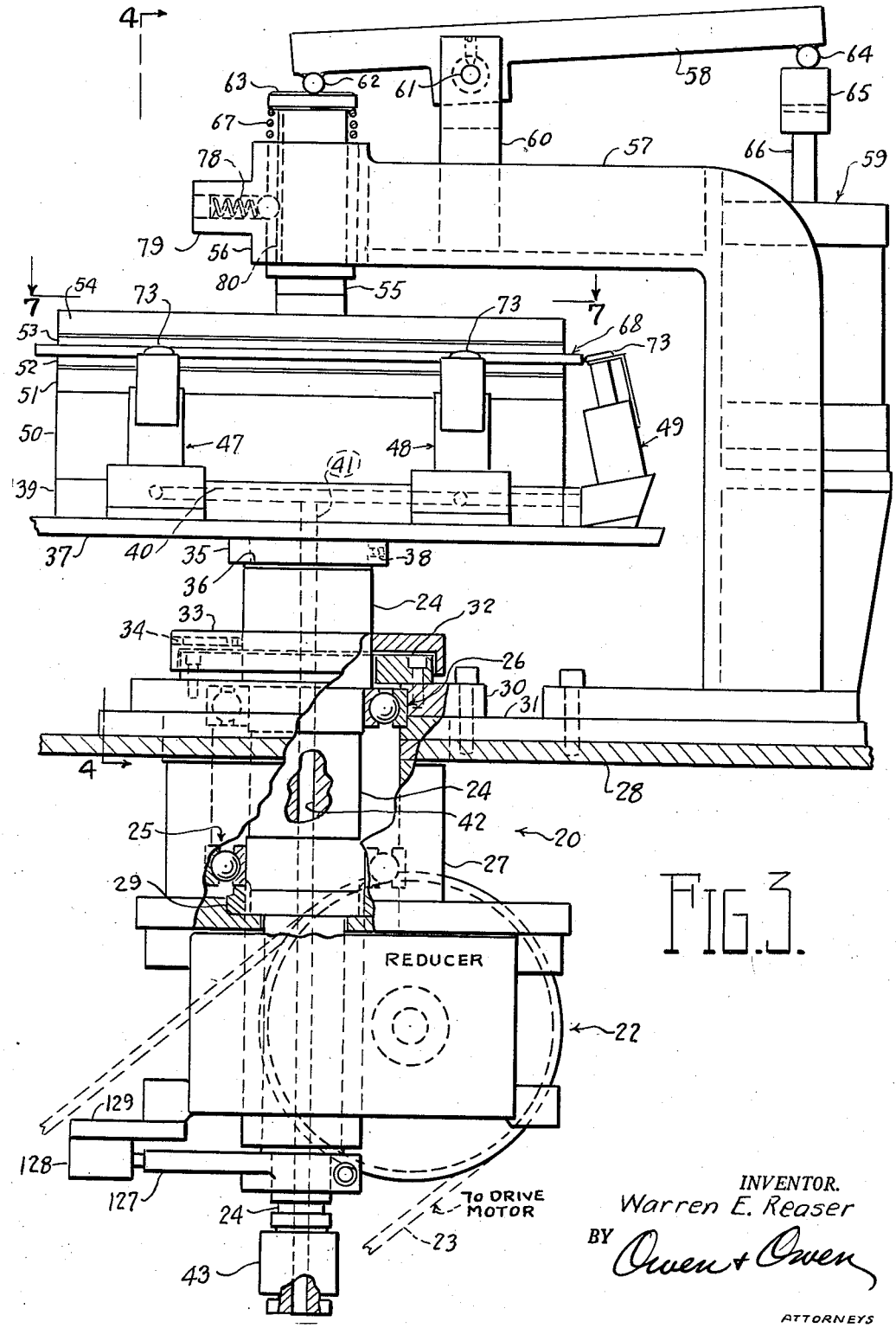

Sept. 29, 1959     W. E. REASER     2,906,065
EDGE GRINDING MACHINE
Filed Dec. 6, 1956     5 Sheets-Sheet 4
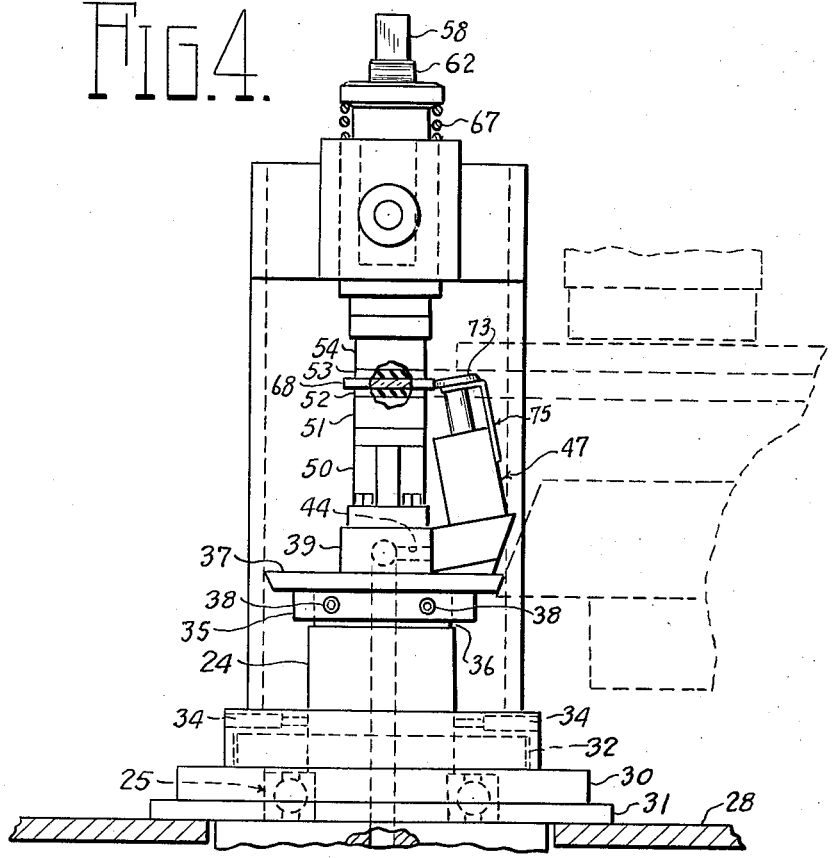
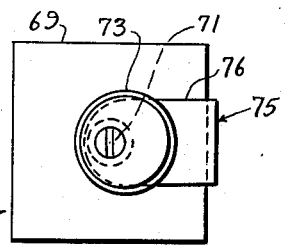
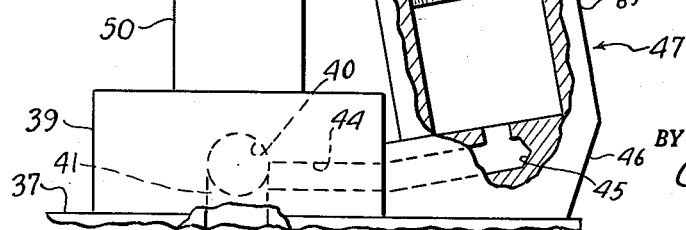
INVENTOR.
Warren E. Reaser
BY Owen + Owen
ATTORNEYS

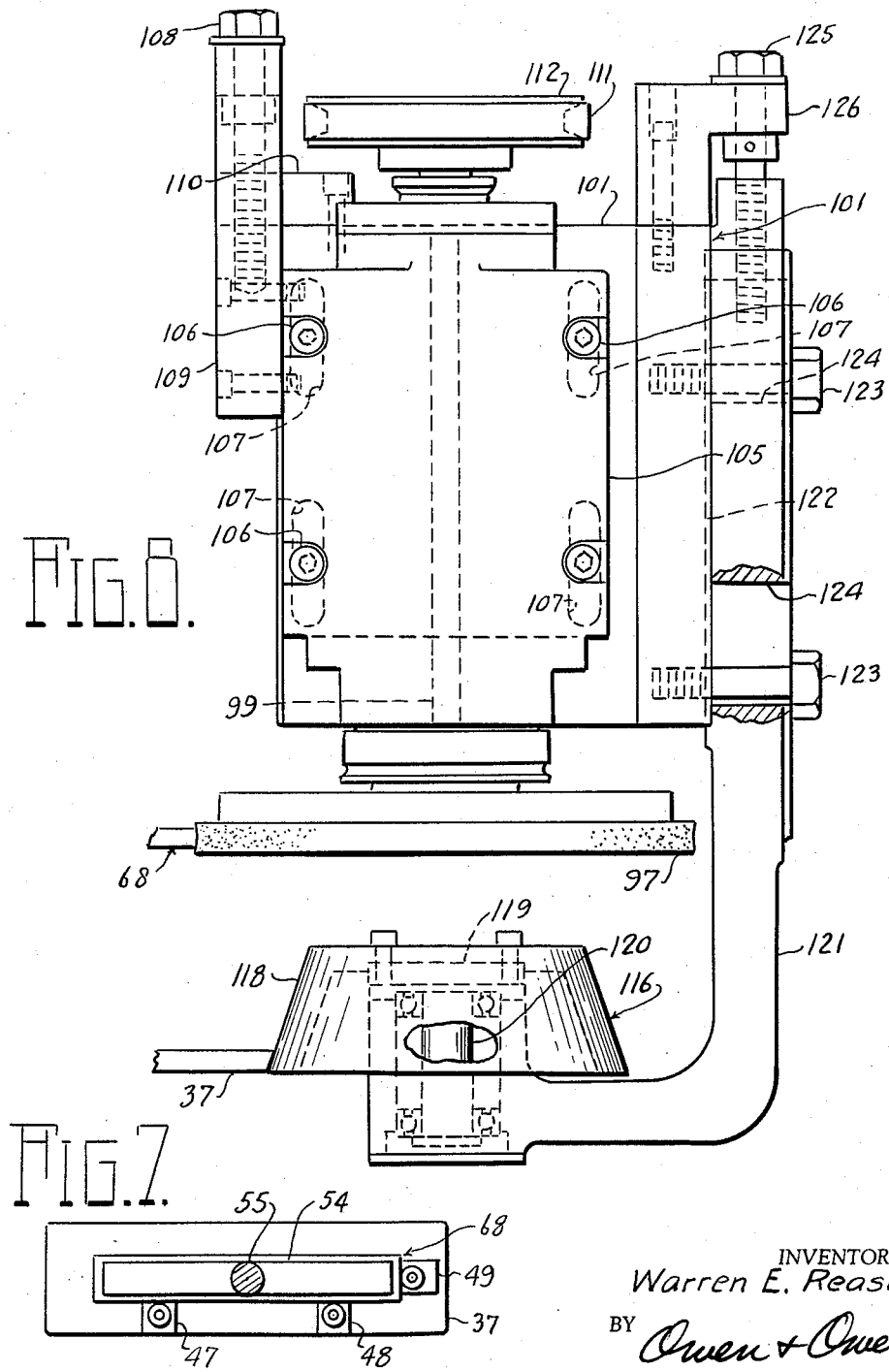

2,906,065

EDGE GRINDING MACHINE

Warren E. Reaser, Toledo, Ohio, assignor to The Sun Tool & Machine Company, Toledo, Ohio, a corporation of Ohio Application December 6, 1956, Serial No. 626,681

5 Claims. (Cl. 51—101)

This invention relates to edge grinding machines particularly designed for finishing the edges of small, generally rectangular, flat, workpieces such as panes of glass for automobile rear vision mirrors, small windows, etc.

The invention will be described in an embodiment designed for grinding the edges of small rectangular glass blanks such as are employed for rear view mirrors.

The principal object of the invention is to provide a machine which will automatically grind the edges of small panes of glass including, but not limited to, finish grinding them to controlled sizes and beveling at least one corner of their edges. In the mass production of automotive parts, for example, rear view mirrors, hundreds of thousands of identical pieces must be fabricated. The present invention, therefore, includes means for establishing template control of the machine operation which will insure that each of the pieces finished is ground to the same size and configuration.

It is a further object of this invention to provide a machine for grinding the edges of small panes of glass or similar articles in which the particular size of the finished pieces is controlled by a template and in which the change from one template to another and thus from one size to another of the finished glass pieces is readily made. While as mentioned, hundreds of thousands of identical pieces are produced in automotive production, it is also true that different automobiles and other vehicles use differently shaped, though similar parts such as rear view mirrors. On a mass production basis, therefore, a machine embodying the invention may be first employed for finishing a rear view mirror for a particular make and design of automobile and then may be shifted over to the finishing of a differently shaped piece for a different make or model of automobile.

It is a further object of the invention to provide an edge grinding machine which can be used to grind the edges of small pieces to a fixed contour and size and which also has provision for beveling the corners of the pieces being finished when such final treatment is desired. Similarly, if other than a beveled edge is desired on the finished piece, a machine embodying the invention may be employed to finish the edge with a different configuration.

It is yet another object of this invention to provide an edge grinding machine having means for simply compensating for the wear on the grinding wheels.

These and other more specific objects and advantages of the invention will be better understood from the specification which follows and from the drawings, in which:

Fig. 1 is a side view in elevation and with parts broken away, showing a machine embodying the invention.

Fig. 2 is a plan view taken from the position indicated by the line 2—2 of Fig. 1 and particularly illustrating the movement and operation of the grinding wheels.

Fig. 3 is a vertical, sectional view on an enlarged scale taken from the position indicated by the line 3—3 of Fig. 2 with certain parts broken away.

Fig. 4 is a fragmentary, vertical sectional view taken along the line 4—4 of Fig. 3.

Fig. 5 is a fragmentary, detailed view of workpiece positioning mechanism, with parts broken away to illustrate the operation thereof.

Fig. 6 is a detailed plan view taken from the position generally indicated by the line 6—6 of Fig. 5.

Fig. 7 is a detailed plan view taken from the position indicated by the line 7—7 of Fig. 3.

Fig. 8 is a fragmentary view taken from the position indicated by the line 8—8 of Figs. 1 and 2 with certain parts broken away and shown on a slightly enlarged scale.

A machine embodying the invention may conveniently be divided into two major sections, viz., the workpiece holding and moving mechanism and the grinding wheel mounting, driving and controlling mechanism. In the machine illustrated in the drawings the workpiece holding and moving mechanism is located generally at the center of the machine and is indicated generally in Figs. 1 and 2 by the reference number 20 and shown in some detail in Fig. 3.

A motor 21 (Fig. 1) drives the input shaft of a reducer 22 to which it is linked by a drive belt 23. A main drive shaft 24 (Fig. 3) is driven by the output side of the reducer 22. The shaft 24 extends vertically through a pair of spaced ball bearings 25 and 26 which are mounted in a support column 27 and carried by a main table 28, respectively. The inner race of the lower bearing 25 is locked in position on the shaft 24 by a lock nut 29 and the upper bearing 26 is positioned by a pair of mounting plates 30 and 31. The shaft 24 extends upwardly through a stationary collar 32 bolted to the plate 30 and a rotating cap 33 is fixed to the shaft 24 by set screws 34 and overlies the collar 32 to prevent the ingress of grinding fluid or particles into the bearings 25 and 26.

A mounting collar 35 rests on a shoulder 36 (see also Fig. 4) near the upper end of the shaft 24. The collar 35 is bolted to the underside of a plate template 37 and locked to the shaft 24 by a plurality of set screws 38. An air manifold 39 (see also Fig. 5) is carried by the plate template 37. The manifold 39 has a longitudinally extending bore 40 which intersects a downwardly extending bore 41 in the manifold 39, the bore 41 being aligned with the upper end of an axial bore 42 extending throughout the length of the shaft 24. At the lower end of the shaft 24 (Fig. 3) a rotating air coupling 43 serves to connect the vertical bore 42 with an air line (not shown). A pair of transverse air passages 44 lead from the bore 40 to one side of the manifold 39 and the end of the bore 40 extends to one end of the manifold 39. The passages 44 and the end of the manifold 39 are aligned with and communicate with air passages 45 (Fig. 5) in the bases 46 of three pneumatically actuated, workpiece positioning devices generally indicated at 47, 48 and 49.

A pedestal 50 is erected on the manifold 39 and supports a platen 51 on its upper end. A resilient platen cushion 52 is adhered to the flat upper surface of the platen 51. The rectilinear dimensions of the platen 51 and cushion 52 are less on all four sides than the piece of glass which is intended to be ground in the particular glass mounting means located on the machine.

The platen 51 and cushion 52 form one side of a workpiece clamp of which the other side is formed by a similar and opposing cushion 53 mounted on the underside of a clamp plate 54. The plate 54 is located on the lower end of a thrust rod 55 slidingly mounted in a collar 56 carried on the forward end of a cantilever frame 57. The frame 57 is rigidly mounted on the main table 28 and also serves to support a rocking lever 58 and an actuating cylinder 59. The rocking lever 58 is pivotally mounted by a yoke 60 on a transverse rocking pin 61. At the front of the rocking lever 58 a thrust bearing 62 rests against a thrust plate 63 mounted on the upper end of the thrust rod 55. At the rear of the rocking lever 58 a similar bearing 64 is engaged with the upper end of a thrust block 65 carried on a piston rod 66 of the cylinder 59. A return spring 67 is coiled around the upper end of the thrust rod 55 between the underside of the thrust plate 63 and the upper end of the collar 56. When the cylinder 59 is energized, its piston rod 66 is thrust upwardly, rocking the lever 58 and thrusting the rod 55 downwardly to squeeze the cushion 53 against the upper surface of a workpiece 68, shown in the drawings as a small rectangular pane of glass, which has previously been placed on the lower cushion 52 by an operator.

When the machine is in position for loading a workpiece into the clamping means described above, the cylinder 59 is not energized and the thrust spring 57 has caused the lever 58 to rock in a clockwise direction (Fig. 3) separating the upper clamp 54 and cushion 53 from the lower cushion 52. The control mechanism of the machine (which is not shown in the drawings) is such that upon the completion of a grinding cycle the glass clamp is opened to permit removal of a finished, ground workpiece 68 and the positioning devices 47, 48 and 49 are simultaneously actuated to move up into their glass positioning location.

Each of the positioning devices 47, 48 and 49 has a base 46 upon which is erected a cylinder 69 (Fig. 5) in which there is located a piston 70 carrying a piston rod 71. A return spring 72 surrounds the rod 71 between the upper face of the piston 70 and the interior of the upper end of the cylinder 69. A circular gauge 73 having a conical periphery is eccentrically mounted on the end of the piston rod 71 by a machine screw 74. A guide 75 has a horizontal arm 76 that is locked between the end of the piston rod 71 and gauge 73, and a vertical arm 77 that is slidingly engaged with the flat exterior of the cylinder 69. It will be observed in the drawings that the cylinder 69 has a flat rear exterior surface that lies in a plane which intersects the horizontal along a line parallel to the line of intersection between the horizontal and the vertical median plane of the platen 51 and template 37. By the engagement of the lower arm 77 of the guide plate 75 with the outer surface of the cylinder 69, the piston 71 and the gauge 73 are prevented from being rotated accidentally during reciprocation of the piston 70 and piston rod 71. The conical periphery of the gauge 73 is cut on an angle complementary to the angle of inclination of the piston 71 away from the vertical so that the innermost side of the gauge 73 touches any vertical edge, such as the edge of the workpiece 68, along a vertical line.

The two side positioning devices 47 and 48 are identical with each other and are equidistantly spaced fore and aft of the transverse center line of the template 37. Thus a single vertical plane tangentially contacts both of the gauges 73. The third positioning device 49 is centered upon the longitudinal center line of the platen 37 and located at one end of the glass mounting means being described. The positioning device 49 is identical to the devices 47 and 48 and has a gauge 73 which serves to position the rear edge of the workpiece 68. By loosening the screws 74, the gauges 73 may be rotated to adjust their positions and align their inner-most edges to centrally position the workpieces 68.

When the machine is in condition to receive a new workpiece and its control has caused the glass clamp to be opened and the positioning devices 47, 48 and 49 to thrust their gauges 73 upwardly, as shown in particular in Figs. 3, 5 and 7, an operator places a workpiece 68 upon the lower cushion 52 pushing it rearwardly and to the right to position it centrally of the template 37. It will be observed in the various figures of the drawings that the workpiece 68 is one-half the size of the template 37 when the workpiece 68 is finished. A spring pressed detent ball 78 (Fig. 3) is located in a boss 79 on the front of the collar 56 and engages with a flat 80 milled on the thrust rod 55 so as to hold the upper clamp plate 54 and cushion 53 relative to the platen 51 and lower cushion 52, when the machine is stopped and the clamp opened.

The grinding mechanism of the machine embodying the invention comprises two wings generally indicated at 81 and 82 (Figs. 1 and 2 particularly). Each of the wings 81 and 82 is swingingly mounted by upper and lower ears 83 and 84 upon a vertical rocking shaft 85 which is in turn mounted and supported by bearings 86 and 87. The bearings 86 and 87 are carried in an upper frame block 88 and a lower block 89 which rests upon the main table 28. The lower ends of the shafts 85 extend beneath the table 28 and crank arms 90 and 91 (Fig. 2) are fixed thereon. The crank arms 90 and 91 are pivotally connected to the ends of piston rods 92 and 93 of rams 94 and 95, respectively. The rams 94 and 95 are swingingly mounted on the lower ends of bosses 96 depending from the underside of the main table 28.

It will thus be seen, particularly in Fig. 2, that when the rams 94 and 95 are energized to thrust their piston rods 92 and 93 outwardly, the two wings 81 and 82 are urged in a clockwise direction (Fig. 2). Conversely, when the rams 94 and 95 are energized to draw their piston rods 92 and 93 inwardly, the wings 81 and 82 are swung in a counterclockwise direction.

Each of the wings 81 and 82 carries the driving and mounting means for one of a pair of grinding wheels 97 or 98 and support mechanism for rotating and for vertically adjusting the position of the particular one of the wheels 97 or 98. Each of the grinding wheels 97 or 98 is mounted upon the lower end of a vertical shaft 99 which is journalled in suitable bearings (not shown) carried in a tubular sleeve 100 at the end of the respective one of the wings 81 and 82. The sleeve 100 is supported by a framework generally indicated at 101 or 102, respectively, that is vertically adjustable relative to its respective wing 81 or 82. The framework 101, for example, is guided for vertical movement by a vertical key 103 engaged in complementary slots milled in a vertical face plate 104 of the wing 81 and a rear plate 105 of the framework 101. The face plate 104 is locked in position on the framework 101 by four locking bolts 106 (Fig. 8) extending through elongated slots 107 in the plate 105. Adjustment of the relative vertical positions of the framework 101 and face plate 104 and thus of the vertical position of the grinding wheel 97 relative to the workpiece 58, is accomplished by rotating an adjusting bolt 108 that is mounted in a support plate 109 at the side of the face plate 104 and is threadingly engaged with a finger 110 carried by the rear plate 105.

While the adjustment of the vertical position of the grinding wheel 97 of the machine shown in the drawings is not critical because it is illustrated as having a cylindrical surface, it will be observed that the grinding wheel 98 is shown as having a beveled surface. Adjustment of the vertical position of the beveled grinding wheel 98 in the manner just described determines the extent of the bevel which the grinding wheel 98 grinds on the lower corners of the workpiece 68.

Similarly, if one of the grinding wheels has a grooved surface for finishing the workpiece with a convex curved edge, vertical adjustment of the concave wheel is necessary to insure centering of the workpiece edge in the groove of the wheel.

Each of the grinding wheels 97 and 98 is rotated through the medium of a belt 111 (Fig. 1) that is engaged with a pulley 112 on the upper end of its shaft 99 and with a pulley 113 mounted on the shaft of a drive motor 114 or 115, respectively, carried by the wing 81 or 82.

Each of the wings 81 or 82 also carries a template contactor 116 or 117, respectively. Each of the template contactors 116 or 117 (Fig. 8) is an inverted cup having a frusto-conical periphery 118 which contacts the edge of the plate template 37. The contactor 116 is removably bolted to a disk 119 on the upper end of a stub shaft 120 that is rotatably journalled at the lower end of a J bar 121. The J bar 121 is slidingly mounted in a way 122 at the edge of the framework 101 or 102 respectively. A pair of locking screws 123 are threaded through slots 124 in the bar 121 and socketed in the framework 101. Vertical adjustment of the position of the J bar 121 and thus the template contactor 116, is accomplished by rotating an adjustment bolt 125 that extends through an ear 126 on the framework 101 and is threaded into the end of the J bar 121.

Because of the conical shape of the periphery 118 of the template contactor 116, if the J bar 121 is raised, the entire wing 81 and thus the grinding wheel 97 is moved outwardly so that the finished size of the workpiece 68 is larger. Conversely, and more usually, in order to compensate for wear on the grinding wheel 97, the template contactor 116 is adjusted downwardly allowing the wing 81 and grinding wheel 97 to swing inwardly farther. This either reduces the size of the finished workpiece 68 or compensates for reduction in the working diameter of the grinding wheel 97 or 98.

Cycling of the machine may be under the principal control of a cycling arm 127 (see Fig. 3) clamped near the bottom end of the shaft 24 and engageable with an actuator on a control switch 128 mounted on a bracket 129 on the bottom of the frame of the reducer 122. The automatic controls with which a machine embodying the invention is equipped are relatively simple and thus are not described or illustrated in the drawings. It is necessary only that pneumatic controls be provided so that the glass clamp is opened at the end of a cycle, allowing the operator to remove a finished workpiece and the positioning devices 47, 48 and 49 are raised to permit the operator to insert a new, rough blank. Following the insertion of the new blank the cycle should then cause the glass clamp to be closed and the positioning devices to be retracted. The main drive should then be energized, or clutched in, so as to rotate the main shaft 24 and the rams 94 actuated to swing the wings 81 and 82 inwardly so that the template followers 116 and 117 follow the template 37 as it rotates. This causes the grinding wheels 97 and 98, of course, to grind and finish the edges of a workpiece 68 to the size determined by the template 37.

In Fig. 2 the template 37 is shown in broken lines after it has rotated approximately 45° in a clockwise direction and is indicated by the reference number 37a. The positions of the two grinding wheels 97 and 98 which are reached when the template 37 has swung to maximum throw, are shown in broken lines and indicated by the reference numbers 97a and 98a. In order to finish the workpiece neatly and to obviate the necessity for grinding away a substantial quantity of material from the workpiece 68 during a single pass, a machine embodying the invention is usually so designed that the main shaft 24 and thus the workpiece 68 makes two complete rotations during each cycle. Suitable relays, valves and other controls of conventional nature may be employed where necessary to effect cycling as described above.

I claim:
1. A machine for grinding the edges of a generally rectangular, flat workpiece, said machine comprising, in combination, a main vertical workpiece shaft and means for rotating said shaft, a workpiece holding unit operatively associated with, for rotation by, said shaft, comprising a flat template, a flat platen mounted co-axially with said template, gauge means for positioning a workpiece on said platen centrally thereof, a movable clamp plate, means for mounting said clamp plate independently of said template, platen and gauge means, parallel to and for rotation coaxially with said platen and for movement toward and away from said platen for clamping a workpiece onto said platen parallel to said template, a swinging grinding wheel mounting unit, a grinding wheel mounted on said unit, a template contactor mounted on said unit for engagement with the edge of said template, and means for rotating said grinding wheel.

2. A machine according to claim 1 in which the gauge means consists of three units, each of said units comprising a gauge and means for moving said gauge between a retracted position away from the plane of the platen and a gauging position adjacent said platen and in line for engagement with the edge of a workpiece on said platen, two of said units being aligned along one side of said platen and the third of said units being positioned at one end of said platen, each of said gauges being adjustable on the associated moving means for varying the gauging position relative to said platen.

3. A machine according to claim 2 in which each of the gauges is a disk eccentrically mounted on a sliding rod that is movable longitudinally into and out of gauging position and the periphery of said disk is engaged by the edge of a workpiece when moved into place on the platen.

4. In an edge grinding machine having a rotatable workpiece shaft, an edge grinding wheel and means for rotating said wheel on an axis parallel to the axis of said workpiece shaft and means for translating said grinding wheel relative to said workpiece shaft, the improvement consisting of workpiece mounting means comprising a removable workpiece template co-axially mounted on said shaft and lying in a plane normal to the axis of said shaft, a workpiece platen mounted co-axially with said template, a clamping plate mounted co-axially with, independently of, and overlying said platen and adapted to clamp a workpiece thereon with all of its edges extending beyond the edges of said platen and clamping plate and means for mounting said plate for movement toward and away from said platen and for rotation co-axially therewith.

5. A machine according to claim 4 in which said clamping plate is mounted on the lower end of a thrust member, and said machine includes an overlying arm for supporting and guiding said thrust member and means for exerting thrust on said thrust member for clamping a workpiece between said clamping plate and said platen.

References Cited in the file of this patent

UNITED STATES PATENTS

| | | |
|---|---|---|
| 2,010,922 | Leonard | Aug. 13, 1935 |
| 2,209,605 | Maynard | July 30, 1940 |
| 2,579,337 | Reaser et al. | Dec. 18, 1951 |
| 2,597,180 | Reaser et al. | May 20, 1952 |
| 2,688,214 | Ogle et al. | Sept. 7, 1954 |